United States Patent [19]

Warren

[11] Patent Number: 5,640,283

[45] Date of Patent: Jun. 17, 1997

[54] WIDE FIELD, LONG FOCAL LENGTH, FOUR MIRROR TELESCOPE

[75] Inventor: David Wheeler Warren, Los Angeles, Calif.

[73] Assignee: The Aerospace Corporation, El Segundo, Calif.

[21] Appl. No.: 546,426

[22] Filed: Oct. 20, 1995

[51] Int. Cl.$^6$ .............................. G02B 17/00; G02B 5/10
[52] U.S. Cl. .......................... 359/859; 359/366; 359/729; 359/731
[58] Field of Search ........................... 359/364–366, 359/726–732, 850–861

[56] References Cited

U.S. PATENT DOCUMENTS

| | | | |
|---|---|---|---|
| 4,189,236 | 2/1980 | Hogg et al. | 359/859 |
| 4,598,981 | 7/1986 | Hallam et al. | 359/366 |
| 5,142,417 | 8/1992 | Brunn | 359/859 |
| 5,144,476 | 9/1992 | Kebo | 359/859 |
| 5,410,434 | 4/1995 | Shafer | 359/859 |

*Primary Examiner*—Thong Nguyen
*Attorney, Agent, or Firm*—Derrick M. Reid

[57] ABSTRACT

An all reflective telescope system generally includes two spherical mirrors, one mild aspheric mirror and one aspheric mirror all centered about a common telescope axis and imaging on a focal surface for easy manufacture, very long focal length, wide field of view, high resolution, compact volume and low weight particularly well suited for space observations, and in a detailed form includes a sectional concave hyberboloidal primary mirror, a circular mild convex ellipsoidal secondary mirror, a sectional concave spherical tertiary mirror and a sectional convex spherical quaternary mirror for focusing an extended distant object onto a concave cylindrical focal surface having a linear array of charge coupled detectors for high resolution imagery, the telescope having high performance operation near diffraction limits and operating at detector resolution limits.

9 Claims, 6 Drawing Sheets

LONG FOCAL LENGTH FOUR MIRROR
ANASTIGMATIC TELESCOPE

THREE MIRROR ANASTIGMATIC TELESCOPE

LONG FOCAL LENGTH THREE MIRROR
ANASTIGMATIC TELESCOPE

LONG FOCAL LENGTH FOUR MIRROR
ANASTIGMATIC TELESCOPE

EXTENDED LINEAR FIELD OF VIEW
FOUR MIRROR ANASTIGMATIC TELESCOPE

| SURFACE | RADIUS OF CURVATURE | CONIC COEFFICIENT | SPACING | DIMENSIONS NM | |
|---|---|---|---|---|---|
| | | | | WIDTH | HEIGHT |
| OBJECT | INFINITE | N/A | INFINITE | N/A | N/A |
| PRIMARY MIRROR | -6538.649 | -1.954 (HYPERBOLOID) | -1599.15 | | |
| SECONDARY MIRROR | -2292.043 | -0.773 (ELLIPSOID) | 1688.923 | 258 | 258 |
| TERTIARY MIRROR | -3971.166 | 0.0 (SPHERE) | -1800 | 376 | 376 |
| QUATERNARY MIRROR | -8513.561 | 0.0 (SPHERE) | 1999.802 | | |
| FOCAL SURFACE | -3342.075 | 0.0 (CYLINDER) | N/A | | |

| NOMINAL WAVELENGTH 560NM | ENTRANCE PUPIL DIAMETER 505NM | FOCAL RATIO F/12.31 | LINEAR FIELD OF VIEW 12.8 | TILT ANGLE +5 |
|---|---|---|---|---|

SPECIFIC EMBODIMENT OF A FOUR MIRROR OPTICAL SYSTEM

FIG. 6

WIDE FIELD, LONG FOCAL LENGTH, FOUR MIRROR TELESCOPE

STATEMENT OF GOVERNMENT INTEREST

This invention was made with Government support under contract number F04701-88-C-0089 awarded by the Department of the Air Force. The Government has certain rights in the invention.

FIELD OF INVENTION

The present invention relates to reflective optical systems for imaging distant objects. More specifically, the present invention relates to a four mirror reflective optical system having a relatively long effective focal length for high resolution imaging of a distant object.

BACKGROUND OF THE INVENTION

Telescope optical systems are designed to focus light from a distant object occupying a finite field of view onto an image focal surface. High definition, high resolution, sharp images require a high spatial frequency content in the image. However, the frequency content can be degraded by optical aberrations which blur the image, increasing the image spot size thereby decreasing image resolution. Telescope optical systems comprise optical elements which focus light while simultaneously attempting to eliminate optical aberrations of the image, including spherical aberration, coma, astigmatism, field curvature and distortion. Two broad categories of optical systems have been used to collect and focus light from a distant object. An all-refracting system may comprise a negative diverging lens disposed between two positive converging lenses, whereas an all-reflective system may comprise a negative convex surface disposed between two positive concave surfaces. An all-reflective system uses mirrors to reflect light in desired directions while an all-refractive system uses lenses to accomplish the same imaging function by refracting the incoming light, as is well known.

All-reflective mirror systems have two principal advantages over all-refractive lens systems. All-reflective systems have geometric light deviating characteristics which are the same for light of any wavelength, so that imaging performance is not affected by chromatic aberrations as with refractive systems. All-reflective systems are therefore preferred for imaging applications which span a broad range of operating wavelengths because they are not affected by chromatic aberrations.

All-reflective systems also have mirrors that can be made in any desired size while the sizes of refractive systems are limited by the availability of high-quality transmissive materials. Large refractive optical systems may in principle control optical aberrations but may still be impractical to build due to the difficulty and expense of producing the required lenses. Large reflective optical systems tend to minimize the expense of manufactured optical elements while also controlling optical aberrations. Large reflective mirrors are easier to construct and are lighter in weight as compared to large refractive lenses. As the size of the telescope apertures increase, for example, above 30 cm, reflective systems are increasingly favored because of limits on the size and quality of refractive materials.

Diffraction limited image quality is a well known goal of optical systems. For reflective mirrors, the angle of incidence equals the angle of reflection except near the edges of a finite mirror aperture. In any finite aperture system, wave phenomena will limit the resolution due to the size of aperture, which truncates the wavefront causing diffraction. Each image point has a finite spatial extent which affects the sharpness of an image, that is, the contrast at the boundaries between the dark and light elements of the image. Diffraction reduces the abruptness of the transitions from dark to light, which is perceived as a degradation of image contrast. The finite aperture size dictates a finite frequency response causing a progressive reduction in contrast as spatial frequency increases. If all telescope anomalies were eliminated, there would still be diffraction because the telescope has a finite size which causes truncation of the wavefront. Hence, the finite size of the telescope aperture causes the image point to grow in size. The image point will not be a perfect image point but a blurred and enlarged image point. Hence, the edge diffraction of the aperture limits the resolution of any telescope. It is generally desirable that any telescope be diffraction limited to achieve the highest resolution possible for a given finite aperture size.

One difficulty with all-reflective systems is achieving good image quality over a wide field of view while minimizing the sizes of individual mirrors and the volume of the telescope package containing the mirror elements. A single mirror with an appropriately shaped surface is capable of forming a perfect geometric image of a single object point. The mathematical description of the surface of the mirror is dictated by the fundamental requirement that the length of any path from the object to the image be equal to the length of any other similar path. For an infinitely distant object point, for example, the theoretical figure which achieves perfect geometric imagery is the paraboloid of revolution. The ideal mirror shape produces the best possible geometric image quality for a given pair of object and image conjugate points. Errors in fabrication distort the actual mirror surface from the ideal shape and cause the size of the geometric image to grow, degrading the frequency content of the image. Even in the absence of errors, diffraction resulting from the finite size of the collecting mirror aperture places an ultimate lower diffraction limit on the size of the image spot for a given system. When the geometric image spot size from the ideal mirror shape with fabrication errors is smaller than the spot size caused by diffraction, the system is said to be diffraction limited. Optimum telescope systems operate near the diffraction limit to provide the highest resolution possible with the least degradation of the frequency content.

An extended object can be considered as a continuum of object points each of which is subject to distortion from perfect imaging by diffraction and optical aberrations. A single mirror surface is generally not capable of perfect imaging for more than one object point and image point. Except in special, impractical cases, a single mirror can not form a perfect image of extended objects. Hence, optical systems must add additional reflective surfaces to provide near perfect imaging of extended objects. Additional surfaces provide additional degrees of freedom which define the shapes and locations of mirror surfaces. Thus, a multiple mirror system has a set of surfaces and spacings defining path lengths traversed by rays propagating from the object to the image. The path lengths for each point are equal for enough object points to span the required angular field of view. A compromise is reached between less that perfect imagery and manufacturability of the reflective surfaces. There is design latitude that does not significantly affect image quality because geometric spots need only be smaller that the diffraction limit. Design difficulty increases with an increase in the field of view of the object to be imaged because of the difficulty in maintaining equal path lengths for an increasing number of conjugate points. Additional mirror surfaces and more complex mirror surface shapes have been used to meet the demands of high quality imaging of large extended objects. The art of optical design consists of finding the best overall compromise between the performance and complexity of an imaging system. Obtaining good image quality over a wide field of view, for example, greater than 2.5 degrees, is difficult in a multiple mirror, all-reflective system. The task is simplified if the field of view is restricted to a one-dimensional line in object space, rather than a two-dimensional circular or square field. This linear field can be scanned to build up the image of a two-dimensional extended object over time.

Aspheric surfaces, which cannot be represented as part of a large sphere, include conic sections such as hyperboloids, paraboloids, ellipsoids and oblate spheroids. A conic section is one of several possible shapes derived from an intersection of a plane with a cone. There are also general aspherics, for which the shape of the surface is represented by a general polynomial equation in one of several established forms. The use of aspheric surfaces is well known. For example, ellipsoidal and hyperboloidal mirrors are described in U.S. Pat. Nos. 4,101,195 and 4,226,501. Both mild and strong aspherics have been used and are characterized by the extent of departure from spherical. Aspheric surfaces are more difficult to manufacture than spherical surfaces and are more complicated to design as part of an optical system. Spherical mirrors are always symmetric because any section of a spherical mirror is the same as any other section. This property makes spherical mirrors easy to manufacture as compared to aspheric mirrors. Aspheric surfaces can, however, replace several spherical surfaces for the purpose of reducing aberrations. Between conic sections and general aspheres, the former are preferred because they are usually easier to fabricate and test.

One prior art telescope with a wide linear field of view is a three mirror anastigmat reflective triplet shown in FIG. 1 herein and described in U.S. Pat. No. 4,240,707. FIG. 1 is a cross-sectional view of image rays, focal surface and mirrors for one object point in a linear field of view. The linear field of view extends orthogonally to the cross section of the focal surface, mirrors and image rays of FIG. 1. In this prior art form, high resolution imaging is achieved with an aperture stop centered on a convex secondary mirror and with concave primary and tertiary mirrors eccentric sections of larger symmetric parent reflective surfaces. The surfaces are typically aspheric, including for example, conic sections, depending on the field of view and image quality desired. With conic aspherics, linear fields of view of up to five degrees on a flat focal surface have been demonstrated. With general aspherics, linear fields up to 15 degrees have been demonstrated. This reflective triplet operates most effectively at focal lengths from three to six times the aperture size; that is, with focal ratios of f/3 to f/6. The focal ratio, often called the f-number, is the ratio of the focal length divided by the aperture diameter. In FIG. 1, the distance from the tertiary mirror to the focal surface is approximately equal to the effective focal length. For this type of telescope system, the overall system length, as characterized by the distance from the tertiary mirror to the focal surface, is typically comparable to the system effective focal length. Long focal lengths are desired for high resolution imaging but are disadvantageously limited by practical sizes of the optical system.

Producing a high resolution image is only one of several desired design goals of a complete optical system. The image must also be detected and recorded to be useful. Optical imaging systems produce high resolution output in part by sampling their images with a large number of detector elements, or pixels. The detector pixel must be small relative to the image size. A large number of samples may be achieved by reducing the pixel size or by increasing image size relative to the pixels by increasing the focal length of the telescope. There is a lower technology limit to detector pixel sizes. For charge coupled device (CCD) type detectors, this limit is presently at about 7 micron pixel size. Once this limit is reached, increased resolution can only be achieved by increasing image size, which requires an increase in focal length. In an all-reflective triplet of the type shown in FIG. 1, one way to increase the focal length of the telescope is by scaling up the whole optical system while maintaining the relative proportions between the mirror shapes, sizes and spacings. This increases the size of the image relative to the detector pixels, producing more samples across the image for increased resolution. However, this approach results in a large package length, weight and volume when the end requirement is a system with a very long effective focal length. An all-reflective triplet with a large effective focal length may be particularly undesirable in applications requiring launch into space, where large physical sizes are prohibited by considerations of weight and cost.

Starting from the prior art reflective triplet of FIG. 1, another way to increase the effective focal length is to redistribute the converging and diverging powers of the three mirrors while maintaining the original spacing between the secondary mirror and the primary and tertiary mirrors. An example of such a resulting system is shown in FIG. 2. The focal length of this optical system may be, for example, 12 times the aperture, giving a focal ratio of f/12. The package size containing the three curved mirrors remains the same. However, the long effective focal length still requires that there be a large spacing between the tertiary mirror and the focal surface, as shown. This long optical path could be folded with a series of flat mirrors in order to package the system within a smaller volume. Such mirrors would, however, complicate the system and add significantly to the weight of the system and so would be disadvantageous for space applications. A further disadvantage to this approach is that the surface of best image quality is typically no longer flat, but follows a curved profile. This makes fabrication of the detector array more difficult, although a mild curvature can be approximated by a series of short, flat array segments distributed along an ideal profile.

FIGS. 1 and 2 demonstrate the difficulties encountered in trying to adapt the prior art three mirror anastigmat design form to applications requiring a long effective focal length. Either the packaged volume must become disadvantageously large, or a number of otherwise unnecessary mirrors must be added to fold the optical path. Either approach is undesirable fox applications which place a premium on system size and weight, for instance, those systems launched into space.

Four mirror reflective systems are also known, for example, the one disclosed in U.S. Pat. No. 5,142,417 at FIG. 2. This optical system advantageously describes an f/12 to f/20 optical system with a large effective focal length. This system also advantageously teaches spherical mirrors for ease of manufacture, but disadvantageously teaches disjointed mirror axes between the mirrors and a disadvantageously resulting relatively small angular field of view. This mirror system adds a fourth mirror to increase the focal length but adds additional telescope design costs and manufacturing complexity. The disjointed mirror axes particularly increase system complexity and alignment requirements, presenting difficult manufacturing challenges. These and other disadvantages are solved or reduced using the present invention.

SUMMARY OF THE INVENTION

An object of the present invention is to reduce the size of telescopes to minimize package weight and volume.

Another object of the present invention is to provide a long focal length, high resolution, all-reflective optical system that is detector technology limited.

Another object of the present invention is to provide a long focal length, high resolution, all-reflective optical system that is diffraction limited.

Still another object of the present invention is to provide an all-reflective four mirror telescope having two spherical mirrors, one mild conic aspheric mirror and one stronger conic aspheric mirror.

Yet another object of the present invention is to provide an all-reflective optical telescope having a wide linear field of view.

Another object of the present invention is to provide a long effective focal length, all-reflective optical system that is detector limited and diffraction limited for optimum resolution.

Still another object of the present invention is to provide an all-reflective optical telescope having a package length which is a fraction of the effective focal length.

A further object of the present invention is to provide a long focal length, high resolution, four mirror optical system using two spherical mirrors, a mild conic aspheric mirror and a strong conic aspheric mirror with centers of symmetry all aligned to a common mirror axis.

Still a further object of the present invention is to provide an all-reflective, four mirror telescope having two positive and two negative mirrors with an unobscured optical path, a long focal length, a wide linear field of view, high resolution and a small package volume.

A further object of the present invention is to provide a four mirror optical system using a concave tertiary and convex quaternary spherical mirrors, a mild convex ellipsoidal secondary mirror and a strong concave hyperboloidal primary mirror with centers of symmetry aligned to a common mirror axis.

The present invention is a four mirror reflective optical telescope for high resolution imaging of distant objects onto a focal surface. The inventive system includes two positive and two negative reflective mirrors with centers of symmetry arranged along a common telescope optical axis. The imaging telescope of the present invention includes a primary, secondary, tertiary and quaternary reflective mirrors. The primary and tertiary mirrors are concave while the secondary and quaternary mirror are convex. The four mirror system has a long effective focal length for high resolution imaging that can be detector and diffraction limited and packaged in a small volume.

In the preferred form, the four mirror system enables redistribution of the optical powers within the system to permit a long effective focal length to be packaged in a relatively small volume. The extra degree of design freedom provided by a fourth mirror also enables the use of tertiary and quaternary mirrors that are spherical instead of aspheric to simplify the fabrication of the mirror elements. The secondary mirror is preferably a mild convex ellipsoid functioning as the optical aperture stop. The secondary mirror is preferably circular, while the primary, tertiary and quaternary mirror are preferably elongated surfaces which may be rectangular or oblong, that is, rectangular with rounded corners. In a preferred form of the invention with maximum resolution, the focal surface is a curved linear surface well suited for a linear array of detectors. The four mirrors may be combined to enable imaging on a curved focal surface for use with linear detector arrays to take advantage of high resolution detectors, including those incorporating time delay and integration capabilities for increased sensitivity.

This all-reflective, four mirror optical system has a wide linear field of view, for example, 6 degrees, long effective focal length, for example twelve times the system aperture, is packaged in a relative small volume, can be made light weight, operates with diffraction limited image, quality and detector limited image quality, and is relatively easier to manufacture by virtue of including only spherical and conic aspheric mirror surfaces with centers of symmetry all aligned to a common telescope axis. These and other advantages will become more apparent from the following detailed description of the preferred embodiment.

BRIEF DESCRIPTION OF THE DRAWINGS

FIG. 6 is specific embodiment of a four mirror optical system.

DETAILED DESCRIPTION OF THE PREFERRED EMBODIMENT

Figure 1:
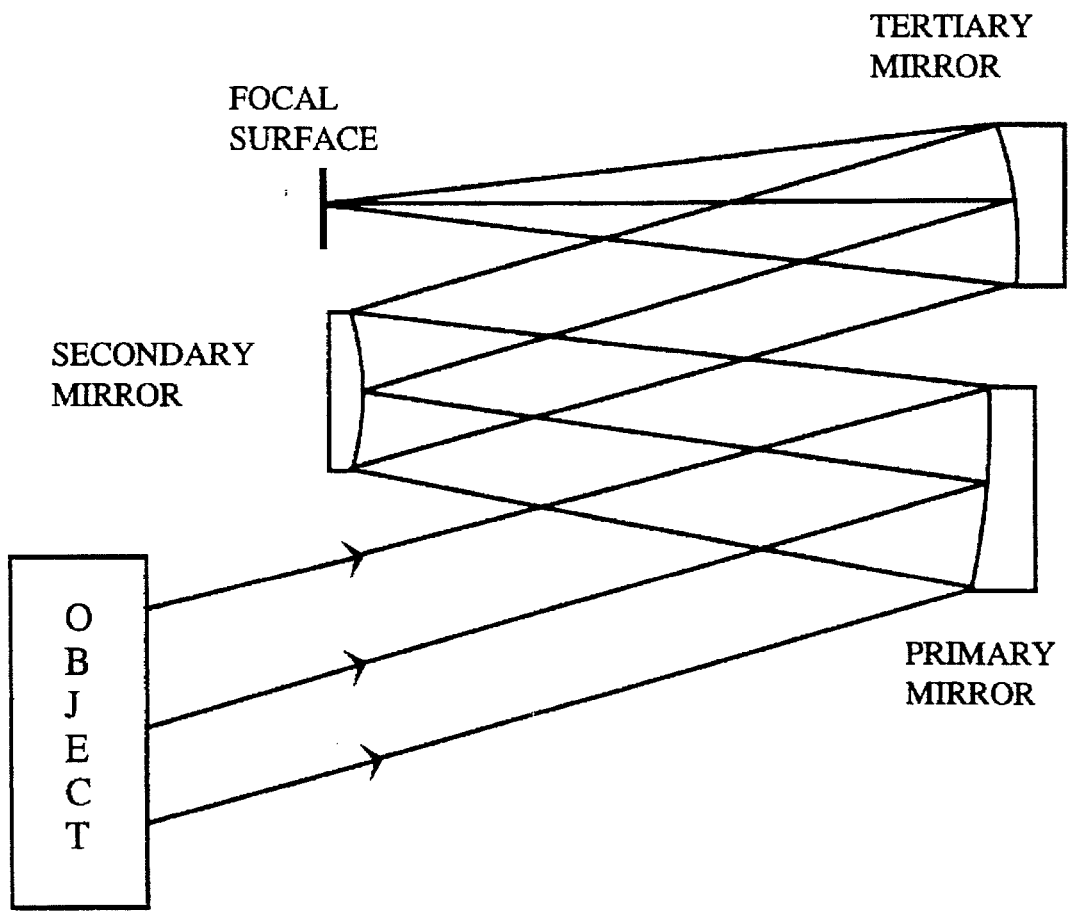
FIG. 1 is a diagram of a prior art three mirror anastigmatic optical telescope having a short focal length.
Figure 2:
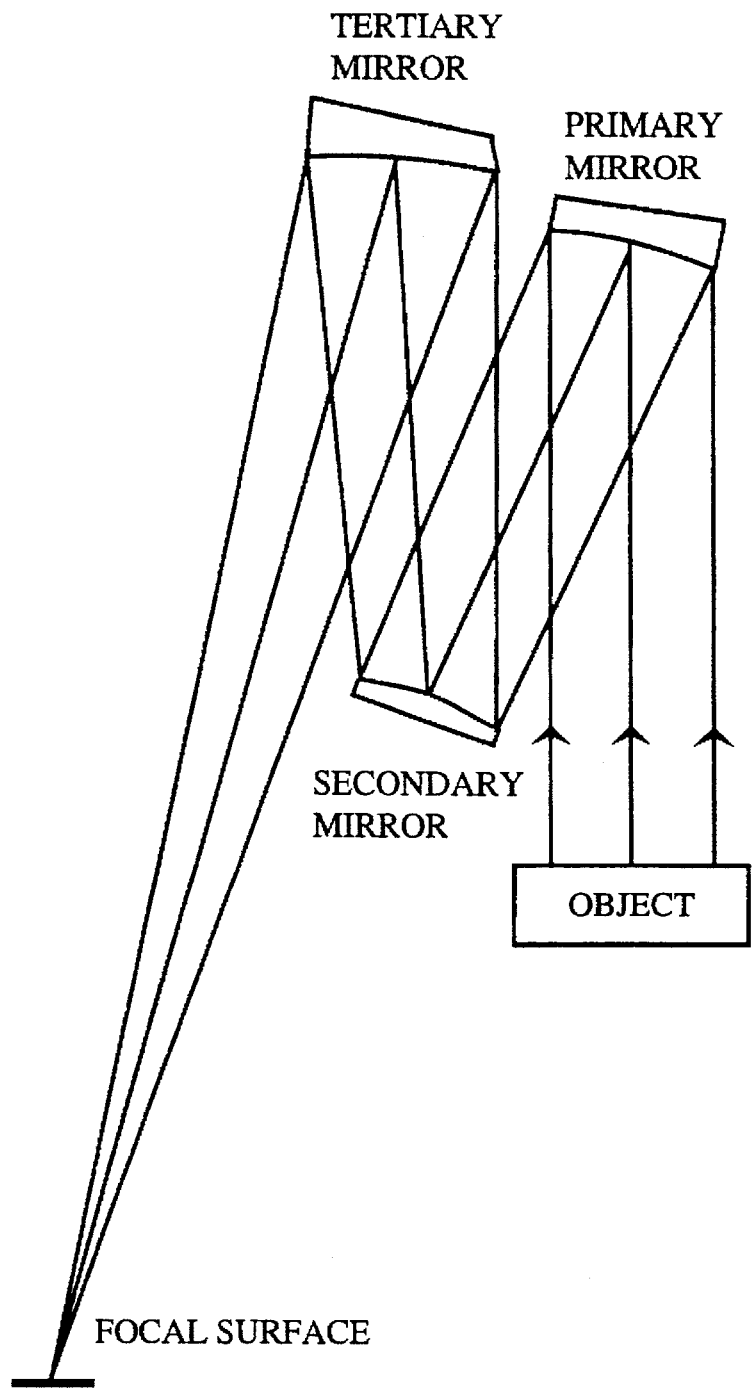
FIG. 2 is a diagram of a prior art three mirror anastigmatic optical telescope having a long focal length.
Figure 3:
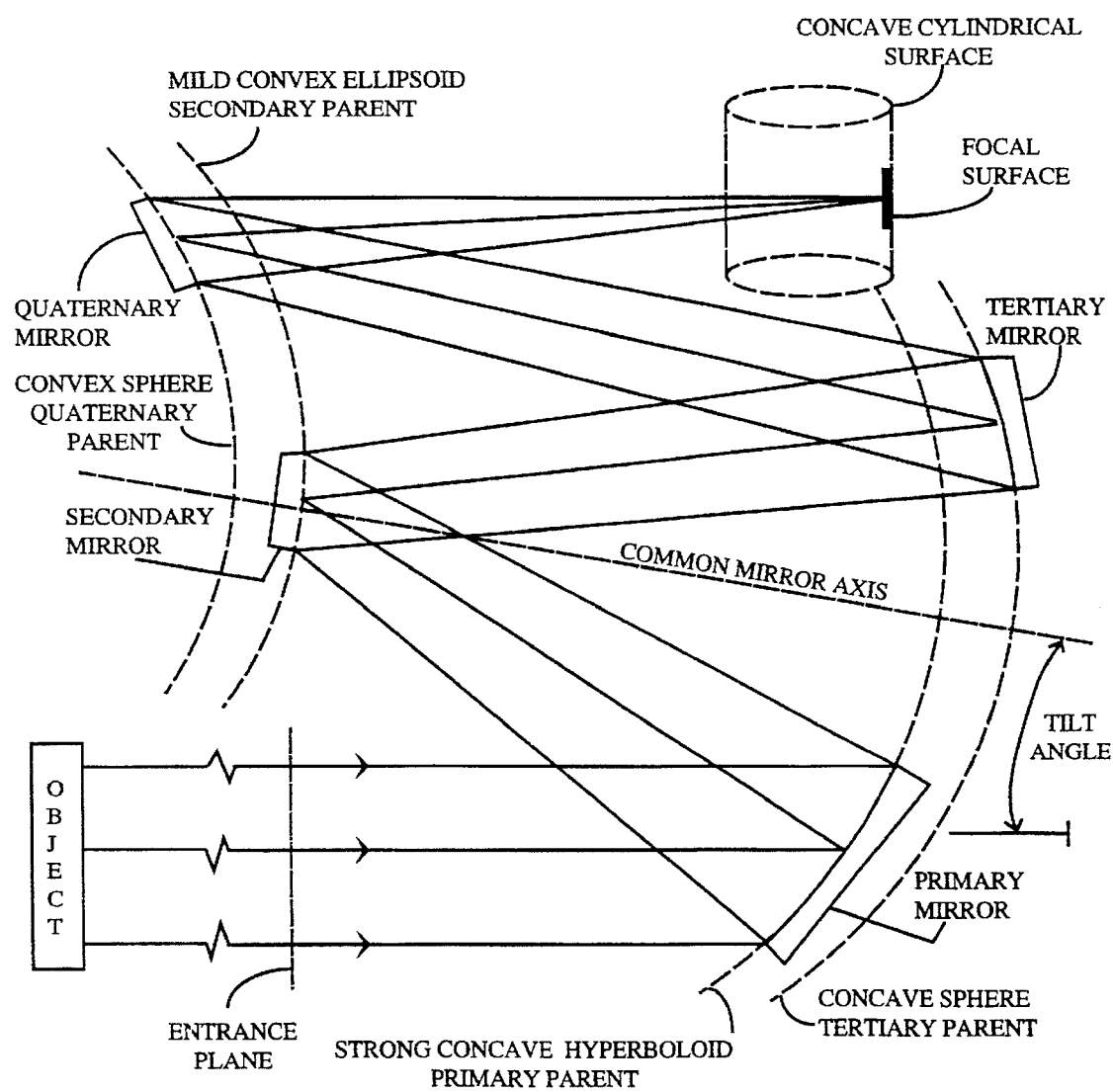
FIG. 3 is a diagram of a four mirror anastigmatic telescope having a long focal length.
Figure 4:
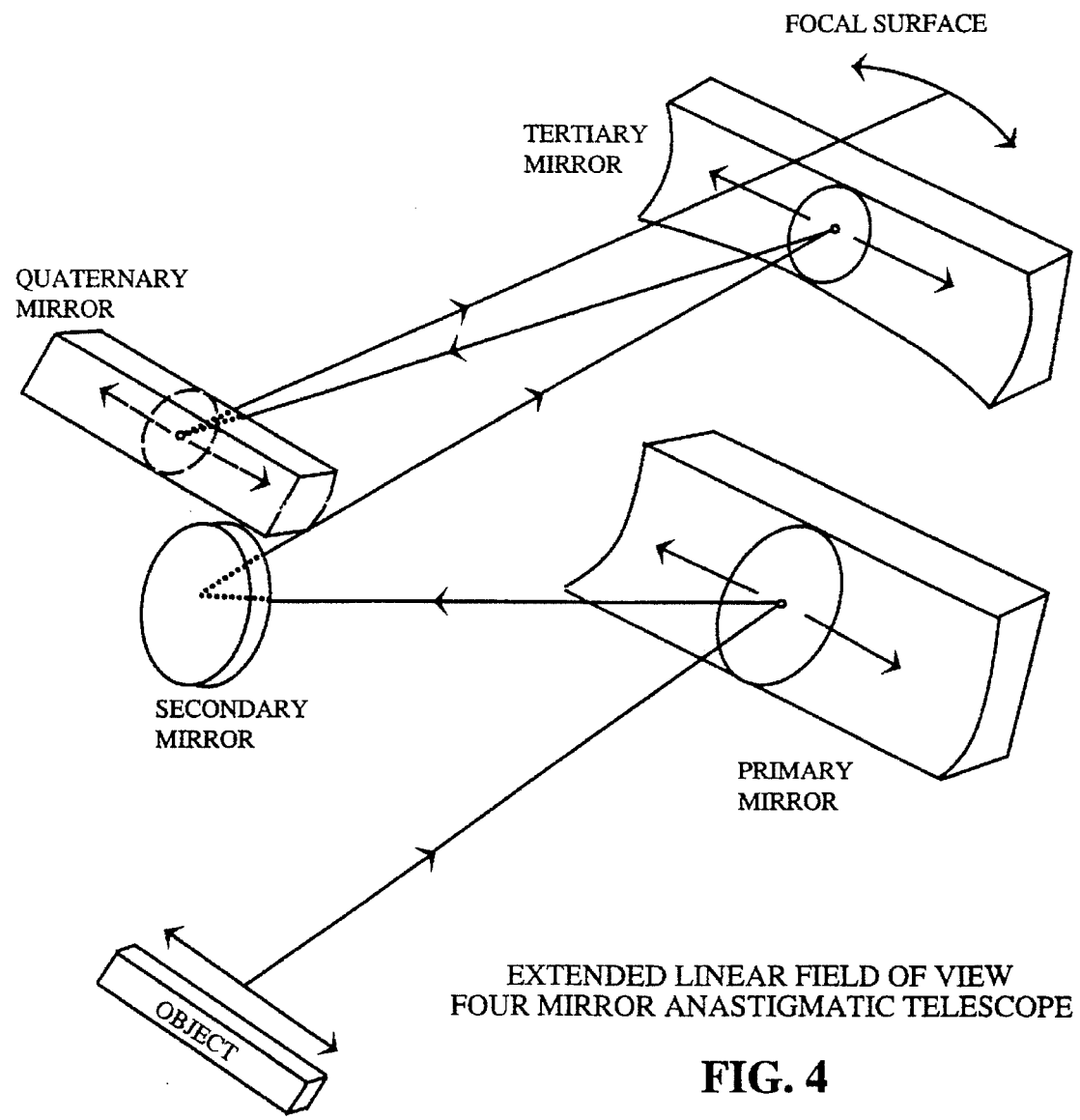
FIG. 4 is an isometric view of the four mirror anastigmatic telescope having a long focal length.

Referring to FIGS. 3 and 4, an anastigmatic telescope comprises four reflective mirrors for imaging a distant extended object onto a focal surface. The four mirrors include a primary, secondary, tertiary and quaternary mirror. The primary and tertiary mirrors are both positive. concave mirrors preferably situated near each other so that the two mirrors can be mounteond a common bulkhead, not shown. The secondary and quaternary mirrors are both negative convex mirrors preferably likewise situated near each other so that they can be mounted on a second bulkhead, also not shown. The separation between the two bulkheads is preferably between one quarter and one third of the effective focal length of the telescope system. The axes of symmetry of all four mirrors are common such that the vertices and centers of curvature of all parent surfaces lie on a common axis. This axis is tilted by several degrees with respect to a light beam arriving at an entrance plane from the object so as to permit the beam to pass through the system without encountering any obscuration by the mirrors.

The primary, tertiary and quaternary mirrors can be described as eccentric sections of larger parent surfaces. Only mirror sections of larger parent surfaces are used so as to prevent obscurations that may block light from the object from passing completely through the telescope optical path. The primary mirror is preferably an eccentric section of a parent concave hyperboloid of revolution. The secondary mirror is preferably a mild, circularly symmetric section of a parent convex ellipsoid mildly deviating by only microns, that is, a few optical wavelengths from a true spherical surface for ease of manufacture. The tertiary mirror is preferably an eccentric section of a parent concave sphere. The quaternary mirror is preferably an eccentric section of a parent convex sphere. An eccentric section of a sphere may be fabricated as a symmetric surface by defining a new fabrication axis which passes through the physical center of the mirror and the center of curvature of the spherical parent surface. Secondary and quaternary mirrors are preferably small mirrors as compared to the primary and tertiary mirrors. The secondary and quaternary mirrors are both smaller than the effective system aperture for reduced cost and weight.

The secondary mirror is the limiting aperture, or aperture stop, of the system. Bundles of light from all points in the field of view are reflected from the same area on the secondary mirror surface. The diameter of the secondary mirror limits the size of the bundles of light from all points in the field, and therefore determines the brightness of the image and the amount of diffraction present. The secondary mirror is preferably symmetric about the common mirror axis of the telescope. The secondary mirror is, therefore, preferably circular in shape and radially symmetric in surface profile, as opposed to the primary, tertiary, and quaternary mirrors which may be elongated in one dimension to accommodate the wide field of view and may be slightly oversized so as not to limit the size of any of the light bundles traveling through the system. An entrance pupil, or effective entrance aperture, is the image of the secondary mirror formed by the primary mirror. In the preferred form, the entrance pupil is located on the opposite side of the primary mirror away from the object. The diameter of the entrance pupil is equal to the effective aperture size. The size of the entrance pupil determines the size of the light bundle that enters the telescope from each point on the object. An entrance plane is an arbitrarily defined portal entrance through which object light passes enroute to the primary mirror. The entrance plane has no effect on system performance and is usually located on the telescope periphery.

In exemplary form, the effective focal length of the telescope may be many times, for example, twelve times, the size of the effective system aperture for high power, high resolution imaging that is diffraction limited. High resolution imaging is further enhanced by available detector technology disposed upon a focal surface. The focal surface is preferably located near the tertiary mirror and may be flat, but is preferably curved to provide sharper imagery. More particularly, the focal surface is preferably a linear section of a parent concave cylinder. The linear focal surface length depends on the field of view of the system. Preferably, the focal surface detector array is formed from an assembly of smaller detector devices, for example, charge coupled devices. The detectors are positioned to follow the cylindrical contour to maintain sharp focus. The length of the focal surface and the horizontal dimensions of the primary, tertiary and quaternary mirrors accommodate the desired linear field of view. The detector array is aligned to the linear focal surface. The focal array may extend for a small distance, for example the equivalent of 0.5 degrees in object space, in a direction parallel to the cylinder axis to accommodate multiple lines of detectors. The additional multiple detector lines can provide multi-color imaging or provide increased signal to noise ratio. Additional multiple detector lines used with time delay and integration signal acquisition may provide increased signal to noise ratios for improved image quality. As may now be apparent, the preferred four minor telescope uses at least two spherical surfaces and a cylindrical focal surface. The tertiary and quaternary mirror are preferably spherical, while the secondary mirror is preferably a mild ellipsoid, all easily manufacturable. The reflective system requires only one mirror of any significant asphericity and fabrication of it is well known by those skilled in the art.

Figure 5:
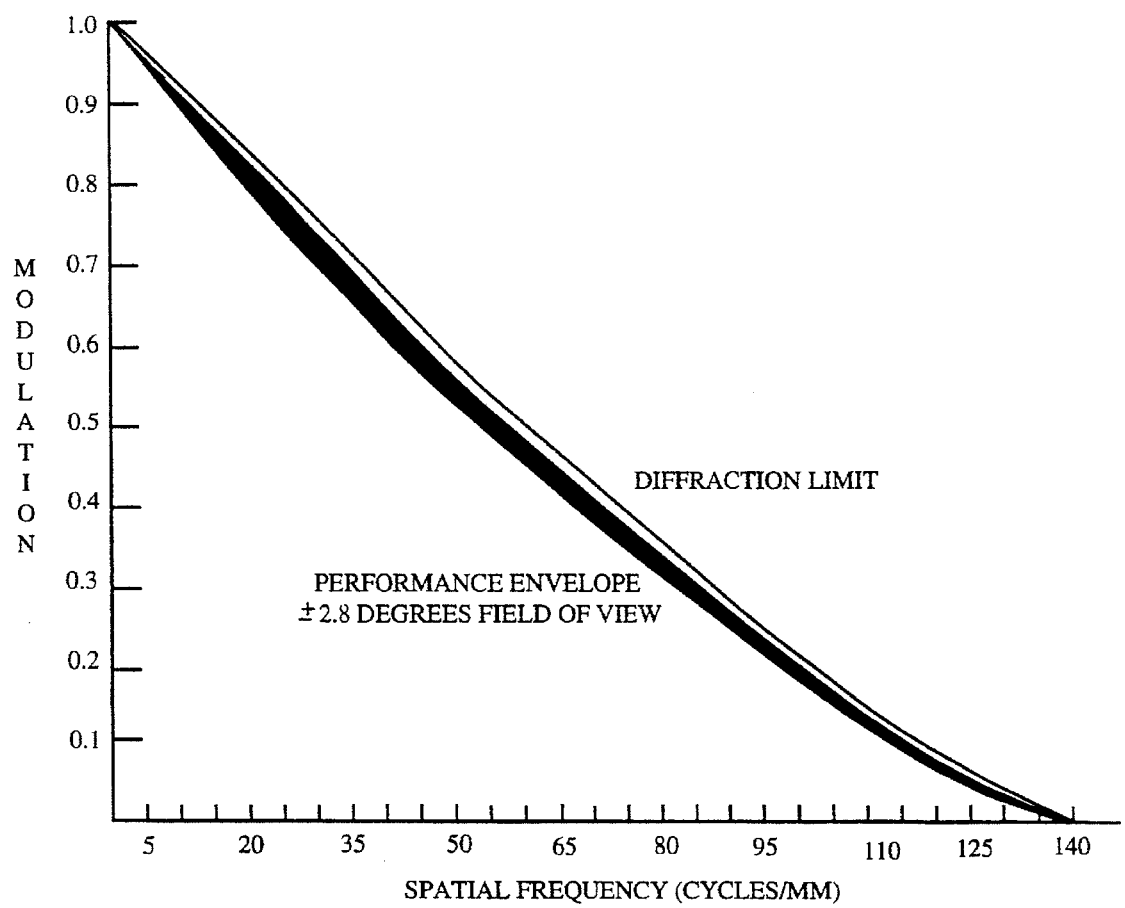
FIG. 5 is a graph of the performance of the four mirror anastigmatic telescope compared to diffraction limited performance for a system with the same aperture and focal length.

FIG. 5 shows the modulation transfer function of the specific embodiment system of FIGS. 3 and 4 having a focal ratio of f/12.3 and a full linear field of view of 5.6 degrees. The performance is nearly diffraction limited over the entire field. In the graph, the top line is the diffraction limit, and the system performance approaches the diffraction limit within a field of view of ±2.8 degrees. In FIG. 5, diffraction is calculated at a nominal wavelength of 560 nm, representative of wavelengths in the visible spectrum. The diffraction limit is wavelength dependent.

Certain parameters are necessary to define a specific embodiment of the preferred form. The preferred telescope is for collecting the image of a distant object projecting an object image and for focusing the collected image onto a focal surface using a arrangement of four reflective mirrors. The telescope has a common telescope axis relative to the axes of the mirrors. The primary mirror is a concave reflective mirror having a parent surface centered about the common axis and is used to collect and reflect the image of the distant object. The image follows an image path from the object. The image path is angularly tilted from the common telescope axis. The secondary mirror is convex reflective mirror also centered about the common telescope axis. The secondary mirror is for receiving and reflecting the object image reflected from the primary mirror. The tertiary mirror is a concave reflective mirror having a parent surface also centered about the common axis and is for receiving and reflecting the object image reflected from the secondary mirror. The quaternary mirror is a convex mirror having a parent surface also centered about the common telescope axis and is for receiving and reflecting the object image reflected from the tertiary mirror. The primary mirror is preferably an eccentric section of a concave hyperboloid of revolution. The tertiary mirror is preferably an eccentric section of a concave sphere. The quaternary mirror is preferably an eccentric section of a convex sphere. The secondary mirror is preferably a mild circularly symmetric convex ellipsoid.

The telescope further includes a plurality of detectors disposed along the focal surface. The plurality of detectors may be a linear array of charge coupled devices aligned as a concave cylindrical linear array providing detector limited image resolution of the object's image. The telescope is defined by a field of view, an effective focal length and an effective aperture size. The full field of view is preferably greater than five degrees. The focal length is preferably greater than twelve times said effective aperture size. The aperture size is preferably defined by the size of said secondary mirror providing diffraction limited image resolution of the object image.

Structurally, the telescope preferably includes a first bulk head, not shown, supporting the secondary and quaternary mirrors and defining an entrance plane, and preferably includes a second bulk head, not shown, supporting the primary and tertiary mirrors. In the preferred form, the focal length may be 6218 mm, with a field of view that may be ±2.8 degrees. Diffraction limited imagery is achieved. The primary concave mirror and secondary convex mirror together define an entrance pupil preferably having a diameter 505 mm which is equal to the effective aperture size at a preferred nominal wavelength of 560 nm. The angular tilt of the common telescope mirror axis may be 5° with respect to the light rays arriving from the object. The primary mirror is preferably an eccentric section of a concave hyperboloid of revolution having a preferred radius of curvature of 6538.649 mm, a preferred conic coefficient of −1.954, and a preferred spacing of 1,600.00 mm from the entrance plane and preferably in the shape of an oblong. The conic coefficient describes the shape of the conic aspheric surface. It is defined as the negative of the square of the eccentricity of the conic section. The conic coefficient of a sphere is 0. The conic coefficient of an ellipsoid is between 0 and −1. The conic coefficient of a paraboloid is −1, and that of a hyperboloid is less than −1. The secondary mirror is preferably a mild circular convex ellipsoid having a preferred radius of curvature of 2292.043 mm, a preferred conic coefficient of −0.773, a preferred spacing of 1,599.15 mm from the primary mirror, and is preferably circular with a preferred diameter of 258 mm. The tertiary mirror is preferably an eccentric section of a concave sphere having a preferred radius of curvature of 3971.116 mm, a preferred conic coefficient of 0.0, a preferred spacing of 1,688.923 mm from the secondary mirror, and is preferably oblong. The quaternary mirror is preferably an eccentric section of convex sphere having a preferred radius of curvature 8513.561 mm, a preferred conic coefficient of 0.0, a preferred spacing of 1,800.00 mm from the tertiary mirror and is preferably oblong. The focal surface is preferably a section of a concave cylinder having a preferred radius of curvature of 3342.075 mm, a preferred conic coefficient of 0.0, and defining a linear focal surface having a spacing of 1999.802 mm from the quaternary mirror.

While the all reflective four mirror telescope may be improved and modified by those skilled in the art, for instance by changing spherical surfaces to aspheric surfaces or conic aspherics to general aspherics to increase the field of view, those improvements and modifications may nonetheless fall within the spirit and scope of the following claims.

I claim:

1. A telescope for imaging an image of an object from a distance onto a focal surface, said telescope having a common axis, said telescope comprising:
    a concave primary mirror having a parent surface centered about said common axis and for collecting and reflecting said image of said object, said image following a path from said object and angularly tilted from said common axis;
    a convex secondary mirror centered about said common axis and for receiving and reflecting said image reflected from said primary mirror;
    a concave tertiary mirror having a parent surface centered about said common axis and for receiving and reflecting said image from said secondary mirror; and
    a convex quaternary mirror having a parent surface centered about said common axis and for receiving and reflecting said image from said tertiary mirror, the convex reflective quaternary mirror is for reflecting said image onto said focal surface.

2. The telescope of claim 1 further comprising a plurality of detectors disposed along said focal surface.

3. The telescope of claim 1 wherein
    said concave primary mirror is an eccentric section of a concave hyperboloid of revolution,
    said convex secondary mirror is a mild circular convex ellipsoid,
    said concave tertiary mirror is an eccentric section of a concave sphere, and
    said convex quaternary mirror is an eccentric section of convex sphere.

4. The telescope of claim 1 further comprising a plurality of detectors disposed along said focal surface, said plurality of detectors being a linear array of charge coupled devices aligned as a concave cylindrical linear array providing detector limited image resolution of said image.

5. A telescope for imaging an image of an object from a distance onto a focal surface, said telescope having a common axis, said telescope comprising:
    a concave primary mirror having a parent surface centered about said common axis and for collecting and reflecting said image of said object, said image following a path from said object and angularly tilted from said common axis;
    a convex secondary mirror centered about said common axis and for receiving and reflecting said image reflected from said primary mirror;
    a concave tertiary mirror having a parent surface centered about said common axis and for receiving and reflecting said image from said secondary mirror; and
    a convex quaternary mirror having a parent surface centered about said common axis and for receiving and reflecting said image from said tertiary mirror, the convex reflective quaternary mirror is for reflecting said image onto said focal surface, and wherein,
    said telescope is defined by a field of view, an effective focal length and an effective aperture size, said field of view is greater than five degrees and said focal length is greater than 12 times said effective aperture size.

6. The telescope of claim 5 further comprising a plurality of detectors disposed along said focal surface.

7. The telescope of claim 5 wherein
    said concave primary mirror is an eccentric section of a concave hyperboloid of revolution,
    said convex secondary mirror is a mild circular convex ellipsoid,
    said concave tertiary mirror is an eccentric section of a concave sphere, and
    said convex quaternary mirror is an eccentric section of convex sphere.

8. The telescope of claim 5 further comprising a plurality of detectors disposed along said focal surface, said plurality of detectors being a linear array of charge coupled devices aligned as a concave cylindrical linear array providing detector limited image resolution of said image.

9. A telescope for imaging an image of an object from a distance onto a focal surface, said telescope having a common axis, said telescope comprising:
    a concave primary mirror having a parent surface centered about said common axis and for collecting and reflecting said image of said object, said image following a path from said object and angularly tilted from said common axis;
    a convex secondary mirror centered about said common axis and for receiving and reflecting said image reflected from said primary mirror;
    a concave tertiary mirror having a parent surface centered about said common axis and for receiving and reflecting said image from said secondary mirror; and
    a convex quaternary mirror having a parent surface centered about said common axis and for receiving and reflecting said image from said tertiary mirror, the convex reflective quaternary mirror is for reflecting said image onto said focal surface, and wherein, said telescope is defined by a field of view, an effective focal length and an effective aperture size, said angular tilt is 5.0 degrees from said common axis, said focal length is 12.31 times said effective aperture size, said field of view is +/−2.8 degrees, said concave primary mirror and said convex secondary mirror together define an entrance pupil diameter of 505 mm which is equal to said effective aperture size, said image on said focal surface has diffraction limited image quality at a nominal wavelength of 560 mm, said concave primary mirror is an eccentric section of a concave hyperboloid of revolution having a radius of curvature of 6538.649 mm, a conic coefficient of −1.954, and spacing of 1,600.00 mm from said entrance plane and is in the shape of an oblong, said convex secondary mirror is a mild circular convex ellipsoid having a radius of curvature of 2292.043 mm, a conic coefficient of −0.773, a spacing of 1,599.15 mm from said concave primary mirror and is circular with a diameter of 258 mm, said concave tertiary mirror is an eccentric section of a concave sphere having a radius of curvature of 3971.116 mm, a conic coefficient of 0.0, a spacing of 1,688,923 mm from said convex secondary mirror and is oblong, said convex quaternary mirror is an eccentric section of convex sphere, having a radius of curvature 8513.561 mm, a conic coefficient of 0.0, a spacing of 1,800,000mm from said concave tertiary mirror and is oblong, and said focal surface is section of a concave cylinder having a radius of curvature of 3342.075 mm, a conic coefficient of 0.0 and a linear focal surface with a spacing of 1999.802 mm from said convex quaternary mirror.

* * * * *

UNITED STATES PATENT AND TRADEMARK OFFICE
CERTIFICATE OF CORRECTION

PATENT NO. : 5,640,283
DATED : June 17, 1997
INVENTOR(S) : David Wheeler Warren

It is certified that error appears in the above-identified patent and that said Letters Patent is hereby corrected as shown below:

Column 4 line 55 "fox" should be "for"

Column 6 line 51 "mounteond" should be "mounted on"

Column 8 line 4 "minor" should be "mirror"

Column 12 lines 13-14 "1,800,000" should be "1,800.000"
IN THE DRAWINGS:
Figure 6 "Dimensions NM" should be "Dimensions MM"

Figure 6 delete both 376's

Figure 6 "505NM" should be "505MM"

Figure 6 12.8 should be +/-2.8

Signed and Sealed this

Twenty-fifth Day of November, 1997

Attest:

BRUCE LEHMAN

Attesting Officer

Commissioner of Patents and Trademarks